June 16, 1964

R. C. FARMER 3,137,173

HORIZON SENSOR TEST EQUIPMENT

Filed Aug. 31, 1962

INVENTOR.
ROGER C. FARMER

BY

*Robert Amer Morton*

ATTORNEY

United States Patent Office 3,137,173
Patented June 16, 1964

3,137,173
HORIZON SENSOR TEST EQUIPMENT
Roger C. Farmer, Darien, Conn., assignor to Barnes
Engineering Company, Stamford, Conn., a corporation
of Delaware
Filed Aug. 31, 1962, Ser. No. 220,778
4 Claims. (Cl. 73—432)

This invention relates to an improved calibrating and alignment device for horizon sensors of the conical scan type.

Conical scan horizon sensors have achieved great practical success and have been used extensively on space vehicles to produce error signals when the vehicle departs from a predetermined attitude in pitch or in roll. A typical conical scan horizon sensor using a rotating germanium prism is described in the Merlen Patent 3,020,407 February 6, 1962.

There is no particular problem in aligning and calibrating horizon sensors in the laboratory where size and weight considerations of the calibrating apparatus do not constitute limitations. However, it is desirable to be able to test and calibrate horizon sensors after installation in the vehicle and in the case of manned space vehicles particularly it is desirable to permit calibration and testing during vehicle flight. This puts a premium on light weight, compactness and low power consumption. The problem is solved by means of the present invention which for the first time produces equipment that can be used on the vehicle itself. This is not to say that the horizon simulators or test equipment of the present invention are not so useful in the laboratory or for production testing but their advantages over equipment presently available are not as great in such uses.

The invention will be described more particularly in connection with the drawings in which.

Figure 2:
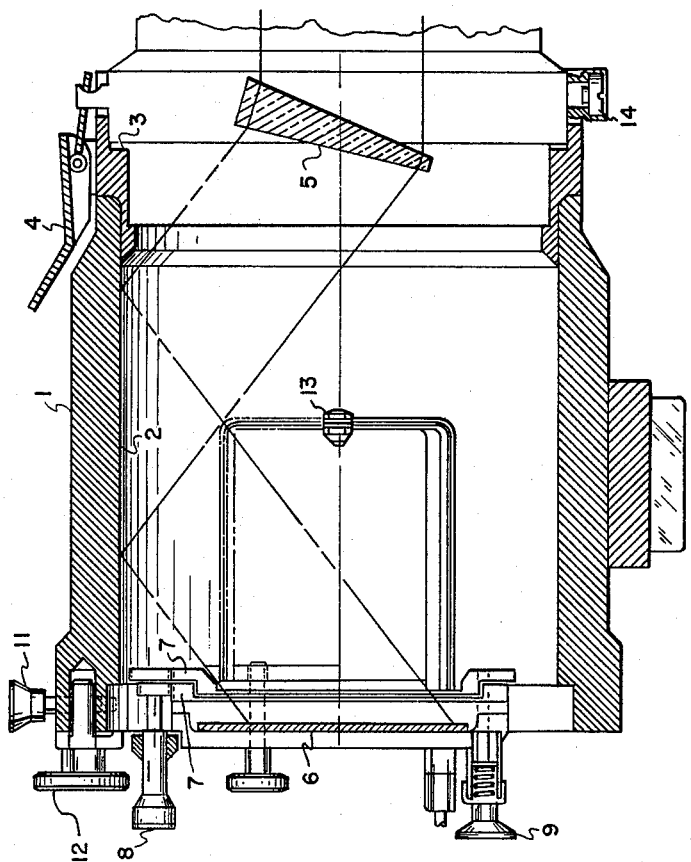
FIG. 2 is a section through FIG. 1 along the line 2—2.

The drawings illustrate a horizon simulator or test equipment according to the present invention applied to a conical scan horizon sensor of the type described in the Merlen patent. Essentially the test equipment comprises a cylindrical housing 1 the inner surface of which is coated with a mirror surface, preferably a surface which shows good reflection in the infrared, as the horizon sensors operate for the most part on infrared radiation. The cylindrical housing is provided with an end piece 3 which mounts on the end of a horizon sensor by means of a suitable latch 4. Fine alignment is effected by the cam 14. The horizon sensor is not shown in detail, the drawing merely showing the rotatable germanium prism 5 which effects the conical scan.

At the opposite end of the cylindrical casing 1 there is mounted an infrared source 6 which is a small heated plate having a surface of good emission. The plate is mounted on a circular mounting 10 which fits into the end of the casing 1. Through it pass a driving gear and dial 8 and a detent 9. The gear 8 serves to move two partial shells 7 which are held together at their rear by the pin 3 on which they can rotate. The mounting 10 for the infrared plate 6 can be turned and clamped into predetermined positions by clamping screws 12. Predetermined positions are located by the detent 11.

The operation of the device is illustrated by the rays in FIG. 2. As the scanning prism 5 turns the horizon sensor sees the radiations from the infrared plate 6 reflected by the mirrow surface 2 except where this is obscured by the vanes. In the latter positions the horizon sensor receives no infrared radiation and this simulates the situation of space scanned. It is true that the backs of the cylindrical shells or vanes are at a temperature above absolute zero and so radiate a certain amount of infrared. However, this radiation is very small as compared to the plate 6 and can be still further reduced by mirror plating on the backs of the shells 7. In any event this is no particular problem as a horizon sensor does not operate by a precise measurement of the temperature difference between the portion of the scan in space and that crossing the earth or other planetary disc. On the contrary the horizon sensor operates by scanning across the discontinuities between the horizon of the planet in question, for example earth, and the much colder space. The discontinuity is just as effective in the simulator even though the temperature of the backs of the vanes or shells is not 0° K.

The relative extent of the scan through space and across the earth is determined by the position of the vanes 7 and in an actual horizon sensor operating from a space vehicle this is a function of altitude and planet subtense. Adjustments of the relative scan across simulated space and simulated earth is effected by turning the knob 8 with its dial. Frequently it is desired to make tests at certain predetermined altitudes and for this purpose suitable depressions are provided and the detent 9 will hold the shells 7 at the particular point chosen. FIG 2 illustrates the situation where the shells 7 have been adjusted for scans of equal length across earth and sky.

Figure 1:
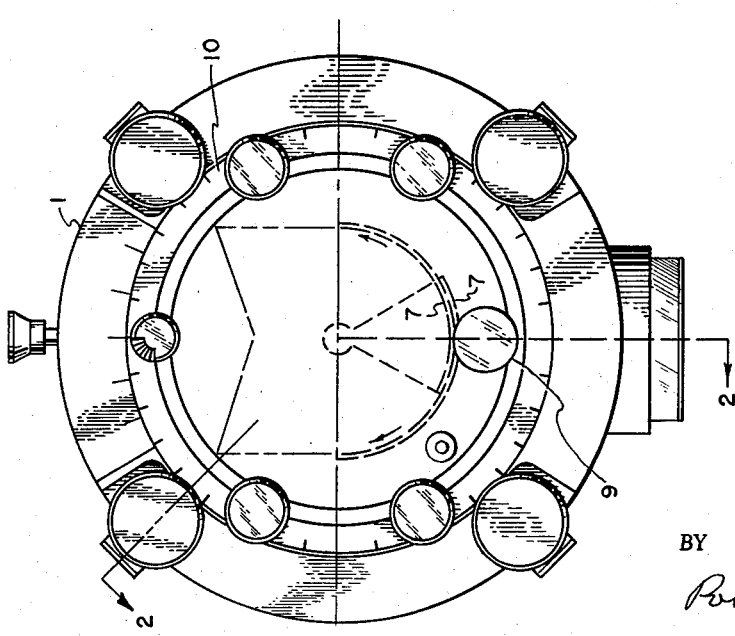
FIG. 1 is a front elevation.

To simulate a tilt the two vanes 7 must be moved together and this is effected by moving the whole mounting plate 10 and clamping it into position corresponding to the desired amount of tilt by means of the clamping screws 12. The tilt can be measured accurately by the markings on 10 and the end of the shell 1. This is shown in FIG. 1 which represents the position corresponding to zero tilt. The scale on the end of 1 may be used as a vernier to read precise tilt angles.

The horizon simulator described is very light as it can be made of light materials such as aluminum, or even if desired out of plastic, and there is a very low power demand. In the device illustrated the small plate 6 requires only three and a half watts of heating current. This is more than an order of magnitude less than in the standard laboratory horizon simulator. Another advantageous feature of the horizon simulator and horizon sensor tester of the present invention is that it automatically aligns itself correctly with horizon sensor when it is latched on. This makes it theoretically possible for the instrument to be used periodically for testing horizon sensors in unattended satellites but complication of mechanism is such that at present this is not particularly desirable. On the other hand, however, in the case of manned vehicles it is perfectly feasible for an astronaut to check his horizon sensors. The largest immediate practical use is, of course, for testing horizon sensors in the field without making it necessary to send the horizon sensor back to a testing laboratory.

It should be noted that when the horizon sensor scans across the portion of the instrument which represents earth essentially the entire heat source will be in the field of view and thus uneven radiance in the heat source is eliminated. This is an important practical advantage because it is very difficult to maintain completely uniform radiation from an extended flat infrared source. Similarly due to the overall symmetry and the position of the heat source temperature gradients in the vane shells 7 will be unnoticed by the sensor since any temperature gradients which exist will be axial, that is to say a plane of constant temperature will be perpendicular to the scan cone axis. The only limit on the accuracy of alignment is the concentricity and perpendicularity of parts to the axis of revolution of the instrument. This does not require any special critical manufacturing procedures and the ordinary care which should be taken in producing an instrument of precision, which this is, are entirely adequate to produce an alignment accuracy which is as great as is required.

The compactness of the horizon simulator also makes a spectrally more precise initial space simulation by removing plate 6 and aiming the horizon sensor and simulator at liquid helium in a Dewar flask. Vanes then represent earth. The compactness also permits tests in extreme environments which are difficult with previously available equipment.

I claim:

1. A horizon simulator and instrument calibrator for horizon sensors of the conical scan type comprising in combination,
   (a) a hollow cylindrical casing having a reflecting inner surface,
   (b) means for attaching the casing to the head of a horizon sensor in predetermined location,
   (c) an infrared heat source at the end of the cylinder opposite the horizon sensor,
   (d) at least one vane rotatable about the optical axis of the instrument and of sufficient extent axially to block radiation from the infrared source to the scanning head of the sensor during a portion of its scan and,
   (e) means for moving the vane about the optic axis to predetermine positions to simulate varying degrees of tilt.

2. An instrument according to claim 1 in which there are two counter rotating vanes and means are provided to rotate them to simulate any desired proportion of space scan to earth scan.

3. An instrument according to claim 2 in which the means for counter rotating the vanes and the infrared source are mounted on an end piece rotatable in the cylinder end and means are provided for rotating and locking it in predetermined positions simulating different angles of tilt.

4. An instrument according to claim 3 provided with detent means to lock the degree of counter rotation of the vane shells at predetermined points.

No references cited.